United States Patent [19]

Chenoweth et al.

[11] Patent Number: 5,109,672

[45] Date of Patent: May 5, 1992

[54] METHOD AND APPARATUS FOR COOLING AND REPLENISHING AIRCRAFT HYDRAULIC ACTUATORS

[75] Inventors: Charles C. Chenoweth; Jan-son Shen, both of Bellevue, Wash.

[73] Assignee: The Boeing Company, Seattle, Wash.

[21] Appl. No.: 464,974

[22] Filed: Jan. 16, 1990

[51] Int. Cl.⁵ .............................................. F16D 31/02
[52] U.S. Cl. ......................................... 60/456; 60/478; 60/912; 60/714; 165/80.4; 244/78; 244/227
[58] Field of Search ................. 60/714, 456, 912, 911, 60/477, 478, 432, 420, 329, 328; 244/78, 117 A, 118.5, 226, 227; 165/80.4; 417/366, 372, 62

[56] References Cited

U.S. PATENT DOCUMENTS

| | | | |
|---|---|---|---|
| 1,566,995 | 12/1925 | Standerwick | 415/17 |
| 2,144,596 | 1/1939 | Daiber | 60/912 |
| 2,162,639 | 6/1939 | Pointis et al. | 417/372 |
| 2,417,256 | 3/1947 | Kremiller | 138/31 |
| 2,659,204 | 11/1953 | Conway et al. | 60/329 |
| 2,764,147 | 9/1956 | Brunner | 60/456 |
| 2,885,963 | 5/1959 | Ivanoff | 417/372 |
| 2,942,555 | 6/1960 | Pezzillo | 417/372 |
| 3,222,866 | 12/1965 | Lehmann . | |
| 3,296,936 | 1/1967 | Wess et al. | 91/49 |
| 3,405,522 | 10/1968 | Tomita | 60/456 |
| 3,498,061 | 3/1970 | Prucha et al. | 60/329 |
| 3,699,847 | 10/1972 | Little | 91/508 |
| 3,828,556 | 8/1974 | Nolden | 60/432 |
| 3,902,318 | 9/1975 | Becker et al. | 60/444 |
| 4,590,764 | 5/1986 | Escobosa | 60/911 |
| 4,630,441 | 12/1986 | Chamberlain | 60/413 |
| 4,729,424 | 3/1988 | Mizuno et al. | 165/80.4 |
| 4,745,744 | 5/1988 | Cherry et al. | 60/420 |
| 4,890,988 | 1/1990 | Kramer et al. | 417/372 |

FOREIGN PATENT DOCUMENTS

| | | | |
|---|---|---|---|
| 1262294 | 10/1989 | Japan | 244/78 |
| 2196588 | 5/1988 | United Kingdom | 244/227 |
| 2199081 | 6/1988 | United Kingdom | 417/366 |

Primary Examiner—Edward K. Look
Assistant Examiner—F. Daniel Lopez
Attorney, Agent, or Firm—Seed and Berry

[57] ABSTRACT

A system for cooling individual integrated actuator packages (IAPs) positioned throughout the aircraft in a power-by-wire actuation system is disclosed. A low-pressure hydraulic fluid circulates throughout the aircraft to control the temperature of the individual IAPs and to maintain and replenish the hydraulic fluid within the individual IAPs. A thermo-control loop containing low-pressure hydraulic fluid includes a pump, low-pressure hydraulic lines, a heat exchanger, a reservoir and a filter. The entire system provides heat transfer for a high- or low-temperature environment, as may be present on an aircraft. The individual IAPs may be coupled together in series or, alternatively, in parallel, depending upon the design constraints of the system. Compared with distributed hydraulic systems, energy consumption, weight, and cost are significantly reduced by using a low hydraulic pressure for the circulating fluid. Survivability is significantly increased over that provided by a distributed hydraulic system.

20 Claims, 4 Drawing Sheets

METHOD AND APPARATUS FOR COOLING AND REPLENISHING AIRCRAFT HYDRAULIC ACTUATORS

TECHNICAL FIELD

This invention relates to aircraft hydraulic systems and, more particularly, to a method and apparatus for cooling and replenishing fluid in a power-by-wire aircraft actuation system.

BACKGROUND OF THE INVENTION

Distributed hydraulic systems are presently used on most commercial and military aircraft. In a distributed hydraulic system, power is transferred from a power generation source to a power utilization device by hydraulic fluid. For example, the hydraulic fluid for powering the flight control actuators, and other such power utilization devices located throughout the entire aircraft, is distributed under high pressure in hydraulic fluid transmission lines from a pump. The hydraulic fluid must generally be under high pressure, 3000 psi, 8000 psi, or the like, to provide sufficient force for driving the hydraulic actuators. The pump is coupled to and driven by an engine shaft. High-pressure lines extend from the pump to the actuators. Flight control effectors are operated and controlled using these actuators.

Distributed hydraulic systems have numerous disadvantages. They are relatively inefficient because of the large pressure losses occurring in the transmission lines and valves. A break or pressure leak at any single point in the high-pressure line causes loss of hydraulic pressure throughout the aircraft, possibly resulting in loss of control of the aircraft. Significant expense is added to the aircraft because the transmission lines must be leak-proof under very high pressure, 3000 psi, 8000 psi, or the like, depending upon the design. In some aircraft, the high-pressure transmission lines are extremely long because of the long distance to the aircraft extremities, such as to the tip of each wing and to the tail, further adding to the weight and likelihood of breakage.

A power-by-wire actuating system for aircraft control systems has been proposed in the prior art. In a power-by-wire system, power is distributed electrically from the power source to the power utilization device rather than hydraulically. The motor-driven pump for providing the high-pressure fluid to the actuator is preferably located as close to the actuator as possible. The assembly of the actuator, pump, and motor is known in the prior art as an "integrated actuator package" ("IAP") or, alternatively, as an "electro-hydrostatic actuator" ("EHA"), jointly referred to herein as an "IAP."

Numerous benefits are provided by using a power-by-wire actuating system. For military aircraft, a significant advantage is enhanced survivability of the aircraft. There are no high-pressure hydraulic lines running throughout the aircraft to the individual actuators, and therefore the likelihood of damage to a hydraulic transmission line is significantly reduced. If one IAP is destroyed with its dedicated hydraulic circuit, the other IAPs continue to operate, permitting the pilot to maintain complete control of the aircraft. Studies have shown significant weight and cost savings are realized with electric wires replacing high-pressure hydraulic lines. Numerous other advantages are provided in a power-by-wire system, including improved performance, reliability, safety, maintainability, power utilization, and the like.

Despite the advantages of a power-by-wire system, none are presently in use in any of today's high-performance military aircraft (although IAPs have been used in the past on British military and commercial aircraft). IAPs operating some flight control surfaces may reach very high temperatures or very low temperatures in flight on a high-performance aircraft. Operation of a hydraulic actuator can cease or degrade if the fluid, or electronics, exceeds a maximum temperature or falls below a minimum temperature. Furthermore, IAP systems, as presently used, require a fluid reservoir for each IAP. Because catastrophic failure results if the hydraulic fluid volume diminishes excessively, a relatively large fluid reservoir must be provided for each IAP.

SUMMARY OF THE INVENTION

It is therefore an object of the invention to provide an apparatus for controlling the maximum temperature of IAPs in a power-by-wire system during operation on subsonic, supersonic, and hypersonic aircraft in flight and on the ground.

It is another object of the invention to provide an apparatus for controlling the minimum temperature of IAPs in a power-by-wire system during operation in flight and on the ground.

It is another object of the invention to provide a method of maintaining and replenishing hydraulic fluid for each power-by-wire actuator system.

It is another object of this invention to provide an apparatus for controlling the fluid flow from the power-by-wire actuation system to retain limited operation in the event of loss of hydraulic fluid supply.

It is another object of this invention to provide a method of maintaining reliable operation of a power-by-wire system on an aircraft throughout its operating lifetime.

These and other objects of the invention, as will be apparent herein, are accomplished by circulating a low-pressure hydraulic fluid throughout the aircraft. Low-pressure lines extend throughout the aircraft. The temperature of the actuator, motor, pump, electronics, and related equipment is controlled by circulation of the low-pressure fluid. The low-pressure fluid is preferably identical in composition and properties to the hydraulic fluid used in the actuator. A centrally located pump, heat exchanger for cooling the fluid, filter, and reservoir are provided in the low-pressure fluid circuit. The IAPs may be coupled together in series or in parallel, depending on the preferred design.

Numerous advantages are provided by circulating a low-pressure hydraulic fluid to individual IAPs. All the components in an IAP can be densely packed and liquid cooled. A large, local reservoir adjacent to each IAP is not required, significantly saving on weight and space. The actuator, low-pressure line, electronics, power cable, and signal transmission path can be insulated, thus controlling the system temperature even with wide environmental temperature variations. Use of a parallel connection in the fluid distribution lines provides the advantage that the fluid flow to each IAP is individually controlled and adjustable to ensure that all IAPs remain within the selected operating temperature range.

DETAILED DESCRIPTION OF THE INVENTION

Figure 1A:
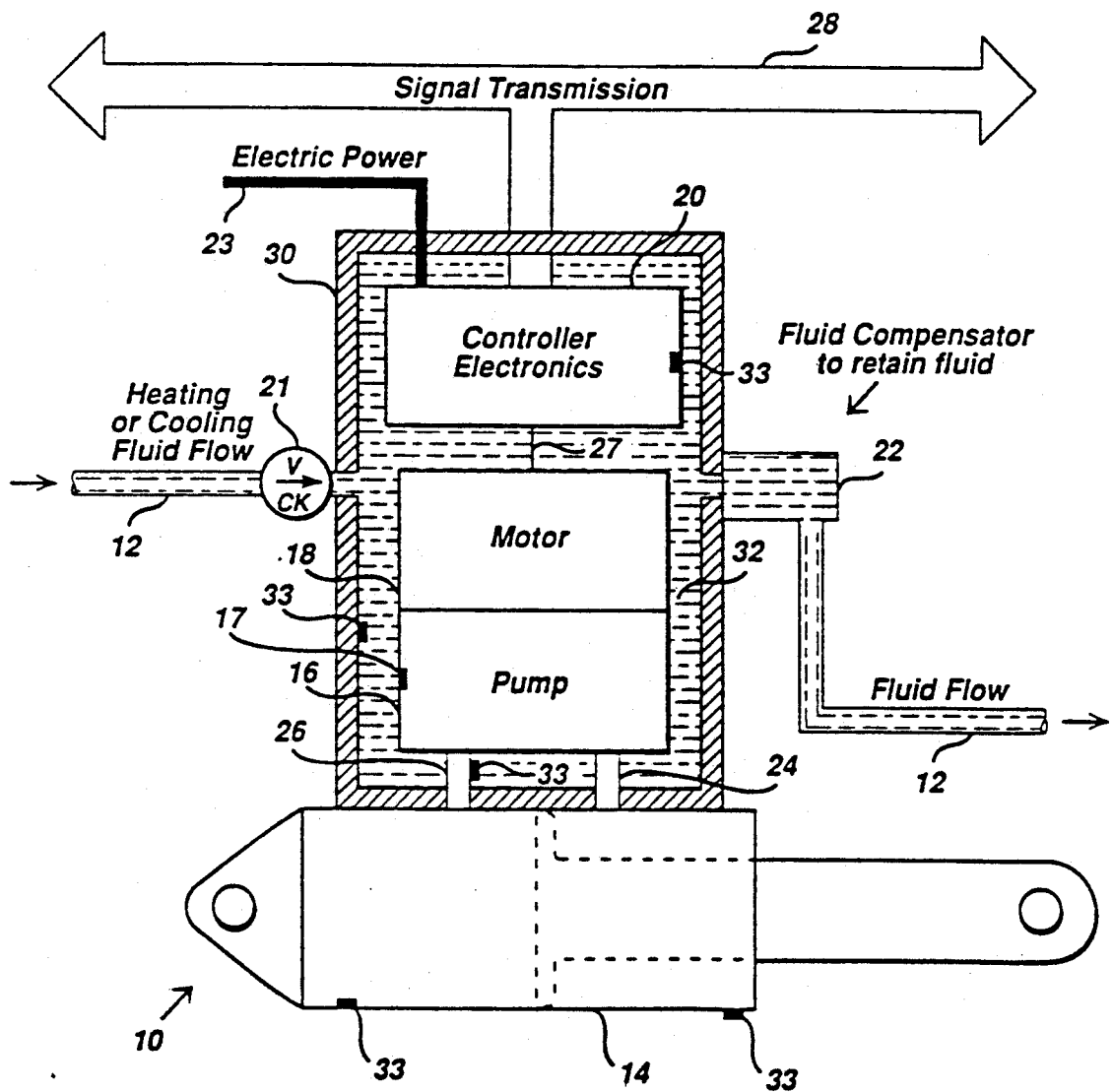
FIG. 1a is a schematic of an individual IAP having low-pressure hydraulic fluid circulated therethrough.

FIG. 1a illustrates an integrated actuator package ("IAP") 10 being temperature-controlled according to the invention. Tubing 12 for circulating low-pressure fluid 32 is coupled to the IAP 10. Many different IAP designs and configurations are known in the art. The invention is described and shown in combination with a particular IAP, the electro-hydrostatic actuator, for illustration purposes, and any conventional IAP is suitable for use in this invention.

The individual IAP 10 illustrated herein includes an actuator 14, a pump 16, a motor 18, an electronic controller 20, a check valve 21, and a fluid compensator 22. The actuator 14 is coupled to a control effector, such as a flight control surface, an engine thrust-directing surface, a thrust release valve, door, or the like, for varying the effector's position under the control of the pilot, autopilot, or other automatic control means. A flight control surface includes a rudder, flaps, an elevator, and the like. The pump 16 provides fluid under high pressure to the actuator 14 through supply lines 24 and 26 to control the output of the actuator. The motor 18 receives electrical power and drives the pump under the control of the controller 20. The controller 20 for controlling the motor 18, and therefore controlling the operation of the actuator 14, is located adjacent to the motor 18. The controller 20 is preferably a combination of digital and analog electronics. Transmission line 27 provides power, control, and data flow between the controller 20 and the motor 18. Electrical power for all IAPs is provided on electrical power line 23 extending throughout the aircraft.

Control signals for the controller 20 are provided from a signal transmission network 28 extending throughout the aircraft. Use of a digital data bus for the signal transmission network 28 permits data and control signals for all actuators to be transmitted on a single twisted pair of wires. Any standard techniques for transmitting commands and data on a data bus or data link, such as are now used in control functions, may be used. Electronics, optics, or the like may be used for the signal transmission network 28, as desired.

A fluid-tight housing 30 surrounds some of the components of the IAP 10, such as the pump 16, motor 18, controller 20, and interconnections therebetween. The housing is adjacent, and may include a portion of, the actuator 14. The housing 30 is filled with low-pressure hydraulic fluid 32. The components within the housing are packaged to permit wet operation, that is, operation while completely submerged in hydraulic fluid 32. Temperature sensors 33 are placed within the housing 30 and around the IAP 10 to provide temperature data to the controller 20. Alternatively, the tubings 24 and 26 coupling the pump 16 to the actuator 14 may be sufficiently long to space the actuator from the housing 30 a selected distance such that the housing does not abut the actuator 14.

A fluid temperature of the high-pressure actuator fluid between 0° F. and 300° F. is acceptable for operation of IAPs 10. Ideally, the temperature is held constant in the lower portion of this range. Under prolonged operation for maximum reliability, the maximum temperature should not exceed 160° F. for thermal stability and electronic equipment cooling.

The fluid 32 enters the housing 30 through check valve 21, circulates around the components, and exits through the fluid compensator 22. As fluid is needed for actuator operation, the pump 16 may draw fluid into an intake 17 from the surrounding fluid 32. In one embodiment, the pump 16 and actuator 14 are a "closed" fluid system and only sufficient fluid to replace the leakage fluid from the actuator 14 is drawn in by the pump 16. In an alternative embodiment, fluid is expelled into the housing 30 from the actuator 14 and new fluid 32 is drawn into the actuator 14 by the pump 16 during each movement of the actuator. The housing 30 is sufficiently small, just large enough to enclose the necessary components, that excessive weight is minimized.

A check valve 21 is coupled at the inlet to the housing 30 and a fluid compensator 22 is coupled into the low-pressure fluid line 12 adjacent to the housing 30. The fluid compensator 22, in combination with the check valve 21, retains fluid within the housing 30 in the event of a break in the line 12. The fluid compensator 22 ensures that sufficient fluid for actuator operation is retained and compensates for expansion and contraction of the hydraulic fluid due to heating and cooling. Fluid compensators and check valves are well known in the art, and any that are presently in use on hydraulic actuators on aircraft today are suitable for use in this invention.

Circulating the fluid 32 around the controller 20, motor 18, and pump 16 controls their operating temperature. In supersonic or hypersonic aircraft, a localized temperature, due to environmental conditions, may exceed the safe operating range for some components of an IAP 10. Circulating the hydraulic fluid 32 around the components ensures that all parts of the IAP are sufficiently cooled during operation. The circulating fluid 32 can also heat the components of the IAP 10, if necessary, such as just before takeoff or when flying in very cold environments. As temperature control is needed, whether for cooling or heating, the circulation rate of the fluid 32 is varied to maintain the proper temperature.

Figure 1B:
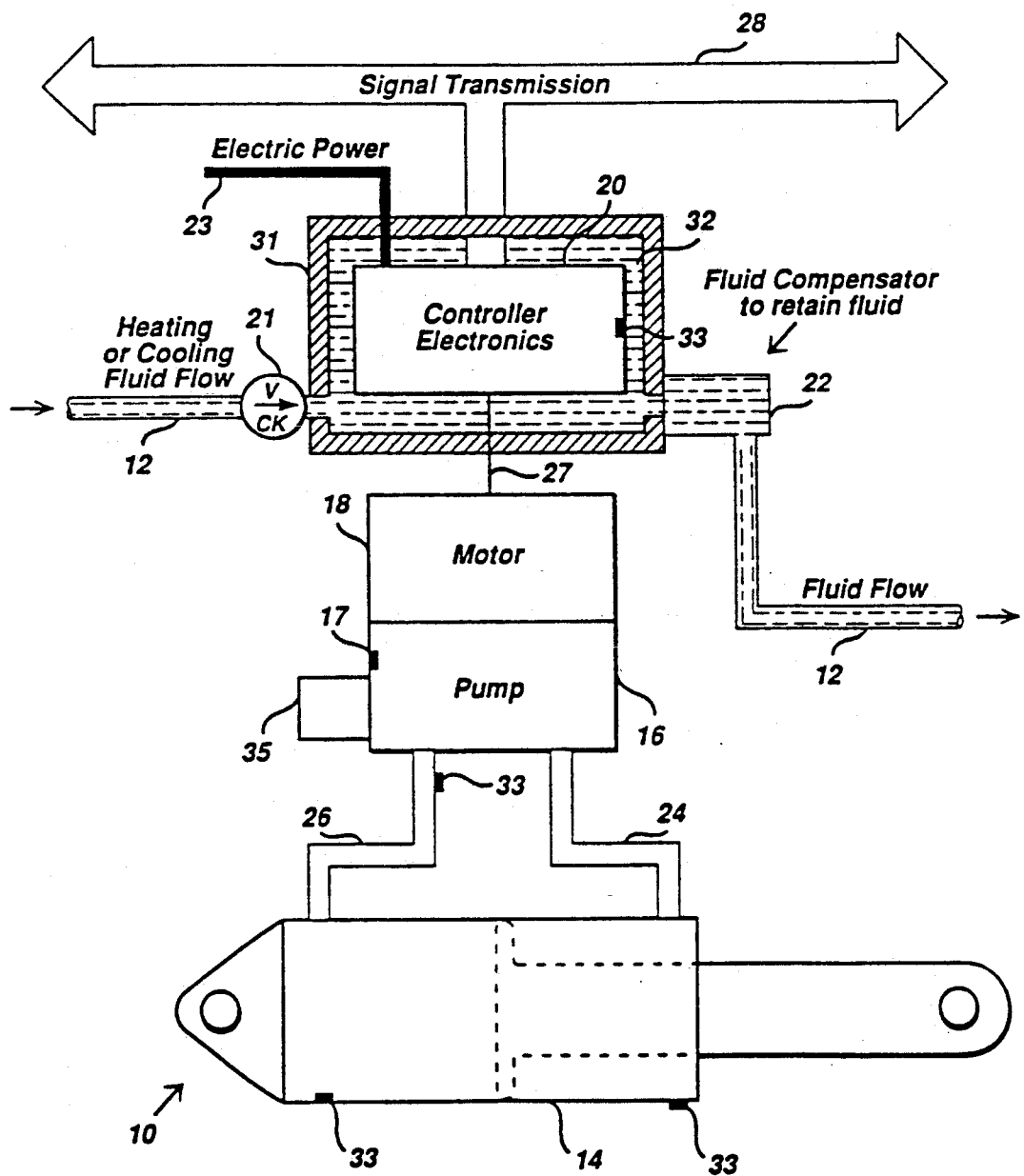
FIG. 1b is a schematic of an alternative embodiment of circulating cooling fluid to an individual IAP.

In an alternative embodiment, shown in FIG. 1b, the motor 18 and pump 16 are in a dry environment rather than a wet environment. The tubings 24 and 26 coupling the pump 16 to the actuator 14 are sufficiently long to space the actuator from the pump 16 a selected distance. The pump 16 is adjacent, but not necessarily abutting, the actuator 14. High-pressure tubings 24 and 26 for carrying high-pressure fluid extend from the pump 16 to the actuator 14. A single pump 16 may service one or more adjacent actuators. The low-pressure tubing 12 is coupled to a housing 31 surrounding the electronics 20 to control the temperature of the electronics 20 with cooling fluid in the manner described herein with respect to the actuator assembly 10. The appropriate check value 21 and fluid compensator 22 may be provided if desired. The electronics 20 will likely be the component most susceptible to degraded performance because of high temperature and likely has a lower maximum temperature than other components and is therefore the only component cooled in this alternative embodiment. A small fluid reservoir 35 is provided adjacent the pump to replenish any fluid lost due to leakage.

In a further alternative embodiment (not shown), the controller 20, motor 18, and pump 16 are all in a dry environment rather than being surrounded by the hydraulic fluid 32. The line 12 is directly coupled to the actuator 14 or the pump 16 through the fluid compensator 22, or to a small, local reservoir adjacent to the actuator. As the actuator 14 operates, the low-pressure fluid 32 intermixes with the fluid being pumped to the actuator 14 to provide the desired temperature control of the actuator 14, pump 16 and/or hydraulic fluid therein. In this embodiment, the low-pressure fluid replenishes the high-pressure fluid and a local reservoir is not needed.

Figure 2:
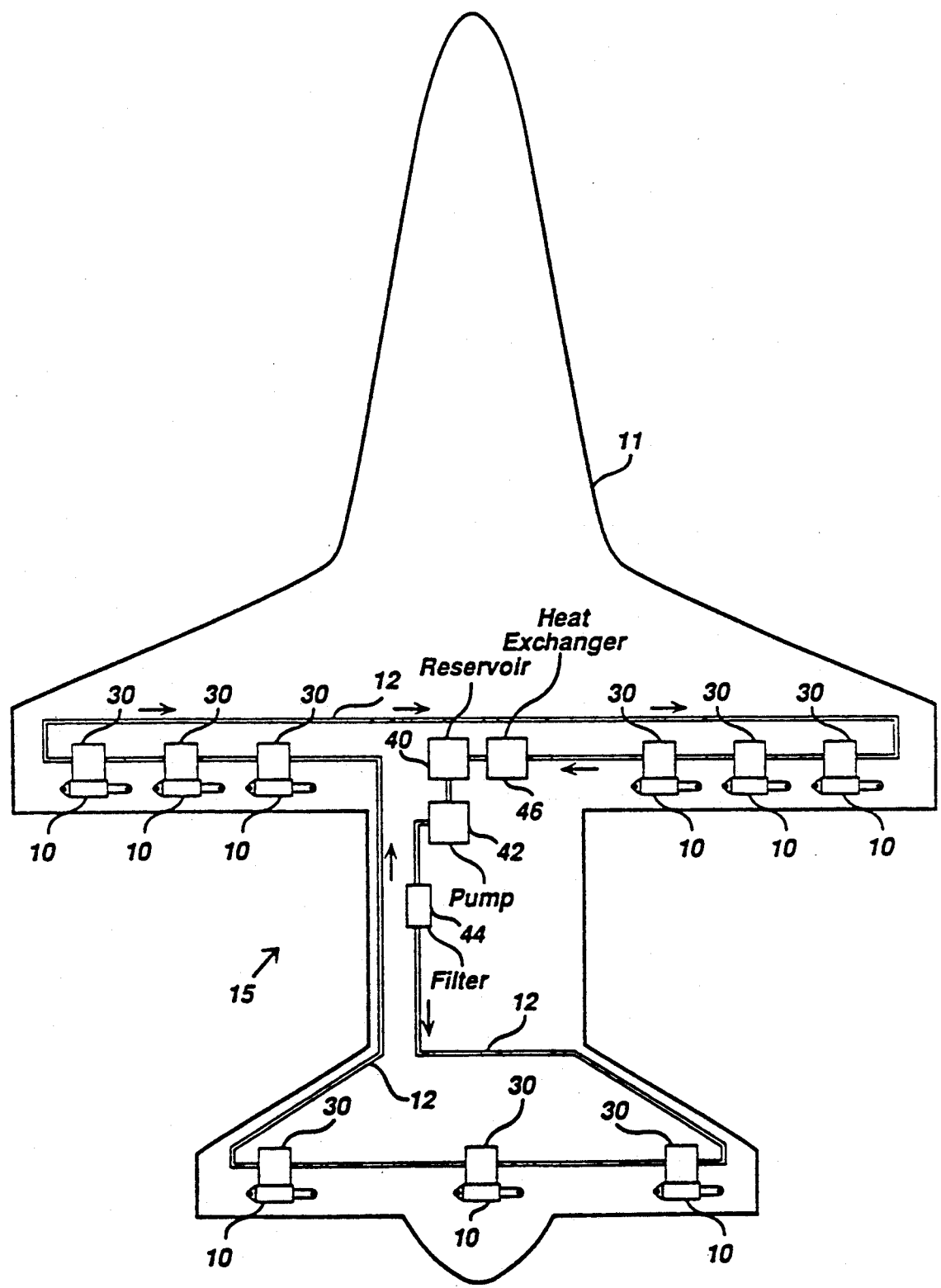
FIG. 2 is a schematic of low-pressure fluid lines extending between individual IAPs.

FIG. 2 illustrates circulation of low-pressure fluid to individual IAPs 10 throughout the aircraft. A pump 42 circulates low-pressure fluid 32 through the line 12 to each IAP 10. The temperature of the low-pressure fluid 32 is controlled by ambient air surrounding the tubing 12. As the fluid 32 travels through the tubing, it is cooled to the ambient air temperature before returning to the pump 42 for recirculation. The pump 42 is a variable volume pump operating generally in the low-pressure range, typically between 10 and 50 psi. A reservoir 40 is coupled to the line 12 for ensuring that sufficient fluid is always present in the line and for each individual IAP 10. A filter 44 may be included in the line 12 to filter the hydraulic fluid pumped under low pressure throughout the aircraft, if desired. A heat exchanger 46 may also be included, if desired, for additional cooling or heating of the low-pressure fluid 32. The fluid 32 is cooled or heated, as needed, in the heat exchanger. In some high-performance aircraft, the ambient compartment temperature may reach 250° F. to 320° F., requiring use of a heat exchanger 46 to provide cooling in addition to that cooling which is provided by circulation of the fluid 32 through line 12. When operating in a cold environment, heating of the fluid 32 by the heat exchanger 46 may be required. Some IAPs rapidly heat up to operating temperature from −65° F. and do not require heating even in subzero environments. The electric power line 23 and signal transmission network 28 extend to each IAP 10, but, for convenience, are not shown.

The centrally located reservoir 40 and filter 44 provide service for the hydraulic fluid for all IAPs 10 located throughout the aircraft. If leakage occurs at individual IAPs 10 throughout the aircraft, additional fluid is provided by the low-pressure fluid 32 from the reservoir 40, the fluid 32 being identical to the fluid used in the IAPs 10. The use of a single central replenishing reservoir 40 saves the weight of having to provide a reservoir for each IAP 10. Operational costs can be reduced by having maintenance performed on the entire system at a central location, such as cleaning and checking at reservoir 40 and filter 44, without the need to clean, test, or fill individual IAPs 10 throughout the aircraft. Circulating low-pressure hydraulic fluid 32 permits use of low-pressure lines, which cost less, weigh less, and are less likely to fail than high-pressure lines. Circulation of low-pressure fluid 32 does not generate the additional heat generated by circulation of a high-pressure fluid in the distributed systems of the prior art.

An additional advantage of the inventive system is that if the low-pressure line 12 extending throughout the aircraft breaks, catastrophic failure does not result. The fluid compensator 22 maintains fluid for use by the IAP 10 if the line 12 is broken. The IAPs 10 continue to operate, even though they are not cooled. Hence the control effectors to which the IAPs 10 are connected remain fully operational because they are controlled by individual IAPs 10. The pilot, or other monitoring system, is alerted to the loss of the cooling capacity of the IAPs 10. Precautionary operation of temperature-sensitive IAPs 10 on a limited basis can continue until the flight can be completed and repairs can be effected. If one IAP 10 is destroyed or ceases to operate, the operation of the other IAPs is not affected. If the control effector is controlled by a plurality of IAPs, it will continue to operate even though one IAP is nonfunctional.

Status data of each IAP 10 is provided through its controller 20 to a central controller (not shown) via the signal transmission network 28. Fluid temperature within each housing 30, status of the fluid, and other data collected by appropriate sensors are transmitted on the signal transmission network 28. For example, temperature data from each IAP 10 is provided to the central controller to control the output of the pump 42 based on the temperature-control requirements. The controller 20 may control a local valve or take other action to maintain the hydraulic fluid 32 in the actuator 14 at the proper temperature.

Figure 3:
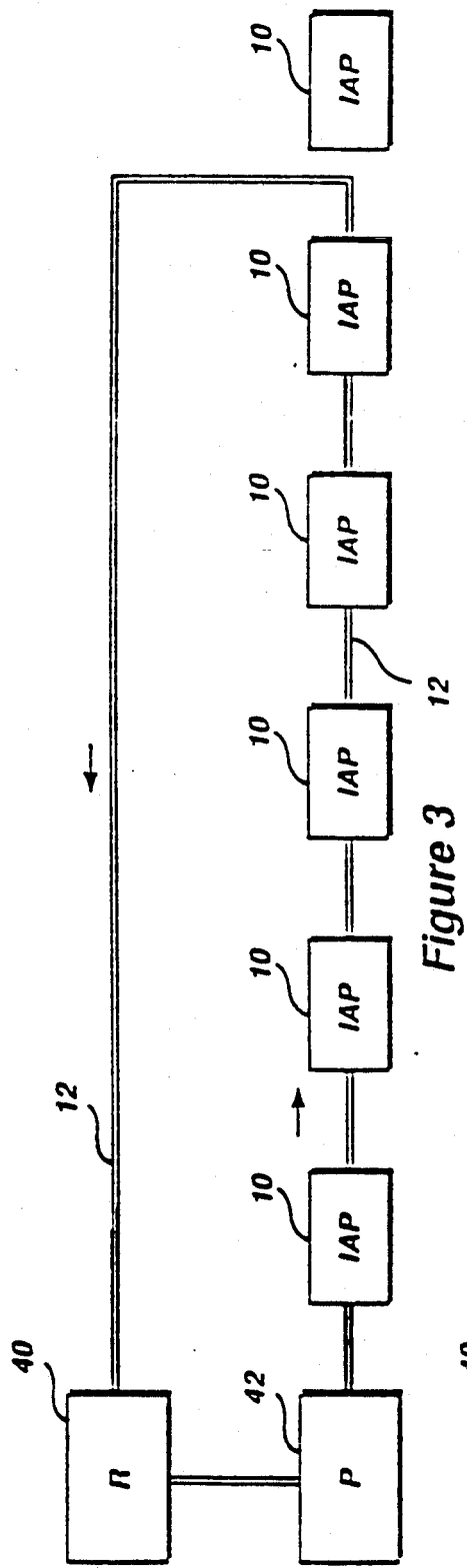
FIG. 3 is a schematic of a low-pressure fluid distribution line connecting the IAPs in series.
Figure 4:
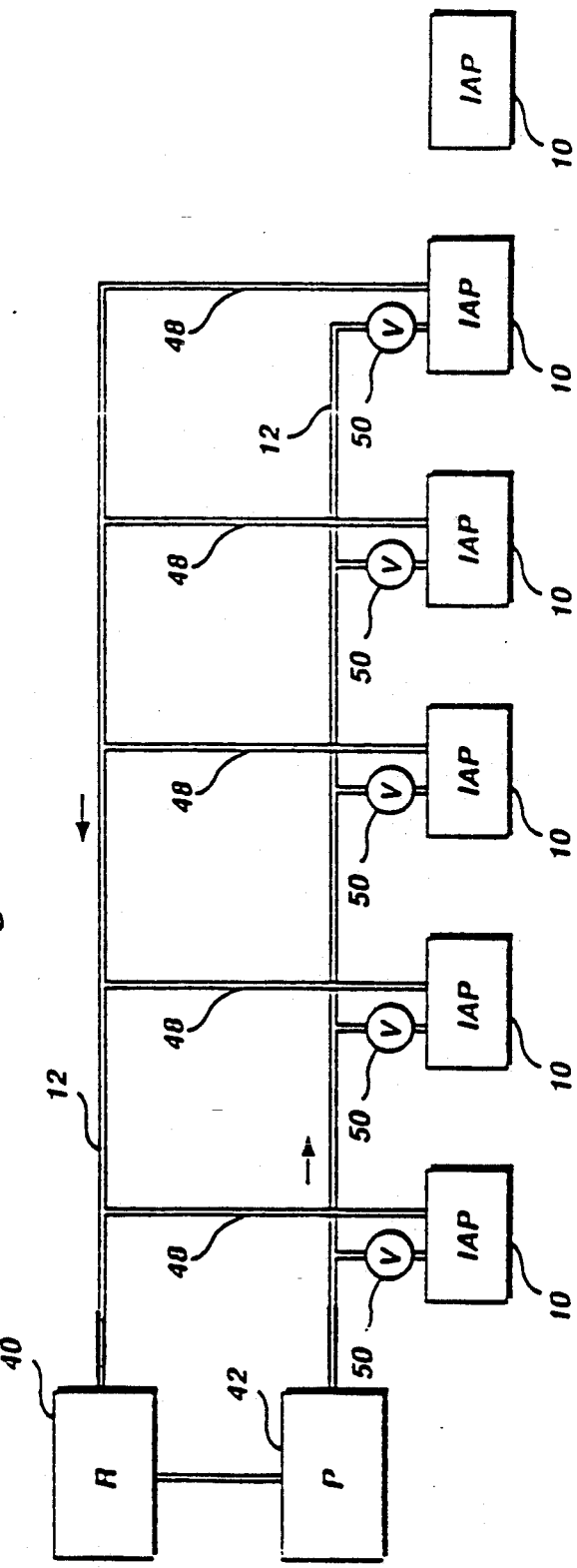
FIG. 4 is a schematic of a low-pressure fluid distribution line connecting the IAPs in parallel.

FIGS. 3 and 4 illustrate alternative connections for the line 12 between individual IAPs 10. The IAPs 10 may be connected in series, as shown in FIG. 3. The line 12 extends from the pump 42 to a first IAP 10, through the first IAP 10 to the second IAP 10, and in a similar manner through all IAPs on the system until it returns to the reservoir 40. A significant advantage of the series coupling is the savings in weight and space of not having independent hydraulic lines 12 to each IAP 10. Another advantage of coupling the IAPs in series is that a constant flow of low-pressure hydraulic fluid through each IAP 10 is ensured. A disadvantage of coupling the IAPs in series is that the low-pressure hydraulic fluid 32 in the line 12 must have sufficient pressure to circulate through the whole system. For example, the low-pressure fluid may require a pressure in the range of 10 to 200 psi upon leaving the pump. Another disadvantage is that the same volume of fluid must be pumped through each IAP 10, which may not provide sufficient temperature control for some IAPs or may cause excessive cooling of others. The temperature-control requirements may vary for each actuator, depending on frequency of use, location in the aircraft, and the like. A further disadvantage is that breakage of line 12 stops flow of cooling fluid 32 to all IAPs 10. Even through there are some disadvantages to coupling the IAPs in series, it is desirable in some aircraft to use the series coupling of FIG. 3.

FIG. 4 illustrates a parallel connection between individual IAPs 10. The pump 42 is connected by line 12 to each IAP 10 on the system. A valve or flow restrictor 50 controls the flow of fluid to each IAP 10. This restrictor valve 50 is controlled by the controller 20 or by a central computer (not shown). The controller 20 and central computer receive inputs from the various temperature sensors 33 in the fluid and adjacent or within the actuator to activate the valve 50, as necessary, to provide the required temperature control. A simple flow restrictor with a fixed orifice may also be used. The advantage of the parallel connection system is that the flow of fluid to each IAP 10 is individually controllable and independent of each other. If one IAP 10 is destroyed, the flow of fluid 32 to the other IAPs 10 can continue. A further advantage is that the pressure in the low-pressure line 12 need only be in the range of 10 to 50 psi to permit circulation of the fluid to each IAP 10. One disadvantage of the parallel system is that more tubing, fittings, and valves are required, adding weight to the aircraft. In some aircraft, a parallel connection system is preferred over the series connection arrangement.

In FIGS. 3 and 4, the line 12 is not coupled to one or more IAPs 10 on the aircraft. Some IAPs may not require temperature control, such as those operating the landing gear, internal doors, or in locations not subject to wide temperature variations. If the temperature control is not necessary, the weight and expense of the line 12 full of hydraulic fluid 32 can be saved.

It is, of course, possible to provide one or more independent low-pressure, local cooling systems throughout the aircraft. The embodiment of FIG. 2 illustrates a single circulating system 15 for circulating fluid throughout the entire aircraft. In an alternative embodiment, a plurality of circulating systems 15 are provided, each having a pump, a reservoir, and a heat exchanger. Each set of closely positioned actuators has its own local cooling system 15. For example, in the tail section of an aircraft, an individual cooling system 15, having its own pump 42, reservoir 40, heat exchanger 46, filter 44, and the like, may be desired. Similarly, the wings, either as a pair or singularly, may have an individual closed-loop circulating system 15. The advantage of using a plurality of local cooling systems is the savings in weight and expense of not having long hydraulic fluid lines distributed throughout the fuselage, from the wings to the tail.

While the invention has been shown and described in particular embodiments, it will be understood that substitution of equipment components that operate in the same way within the environment of the invention falls within the scope of the invention.

We claim:

1. A hydraulic control system for an aircraft, comprising:
   a plurality of actuator assemblies within said aircraft, each actuator assembly including a hydraulic actuator, a high pressure pump means for providing hydraulic fluid under high pressure to said actuator, and a motor means for driving said pump, each of said actuator assemblies being located generally adjacent an aircraft control effector to be controlled by said actuator assembly;
   an electrical power cable coupled to each of said actuator assemblies;
   a low-pressure pumping means for forcibly circulating low-pressure hydraulic fluid from said pump to said actuator assemblies under low pressure; and
   a fluid transmission means extending in series between each of said actuator assemblies and said pumping means for providing a series flow of said low-pressure hydraulic fluid to each of said actuator assemblies from one actuator assembly to another actuator assembly.

2. The system of claim 1 wherein said actuator assembly also includes an electronic controller located within said actuator assembly.

3. The system of claim 2, further including:
   a signal transmission circuit coupled to said electonic controller of each of said actuators; and
   a central controller coupled to said signal transmission circuit for transmitting control signals to said actuator assemblies for controlling their operation.

4. The system according to claim 1, further including a temperature-sensing means within said low-pressure hydraulic fluid for sensing the temperature of said low-pressure fluid.

5. The system according to claim 1, further including a fluid-tight housing enclosing said motor, and said pump, said fluid transmission means being coupled to an inlet and an outlet of said housing, said housing being filled with said low-pressure hydraulic fluid which surrounds said actuator assembly to maintain the temperature of said actuator assembly within a selected range.

6. The system according to claim 5, further including a fluid compensator coupled to the outlet of said housing for controlling the fluid flow out of said housing.

7. The system accoding to claim 1 wherein said plurality of actuator assemblies includes only a portion of the actuator assemblies used on said aircraft.

8. The system according to claim 1, further including a filter means in said fluid transmission means for filtering said low-pressure hydraulic fluid.

9. A method of cooling a plurality of actuator assemblies, each of said actuator assemblies being coupled to a control effector, including a flight control surface of an aircraft and each including an actuator having hydraulic fluid therein, a high-pressure pump positioned adjacent said actuator for providing the hydraulic fluid in said actuator under high pressure, and a motor for driving said pump positioned adjacent said pump comprising:
   pumping hydraulic fluid under high pressure into said actuator from said pump to vary the position of said control effector; and
   circulating hydraulic fluid under low-pressure from a central low-pressure pump to said plurality of actuator assemblies and back to said central low-pressure pump through a fluid transmission tubing which extends in series from said central low-pressure pump to a first actuator assembly and from said first actuator assembly to a second actuator assembly and from said second actuator assembly to a third actuator assembly, and so on for each actuator within said plurality, said hydraulic fluid under low pressure being circulated in series between said actuator assemblies.

10. The method according to claim 9, further including the step of:
   mixing said hydraulic fluid under low pressure with the hydraulic fluid in said actuator, said hydraulic fluid under low pressure being the same type that is within each of said actuators.

11. The method according to claim 9, further including:
   sensing the temperature of said hydraulic fluid within each of said actuator assemblies; and
   varying the circulating flow volume of said hydraulic fluid under low pressure to said actuator assemblies to maintain the temperature of said actuator assemblies within a selected temperature range.

12. A hydraulic control system for aircraft, comprising:
   a plurality of actuator assemblies within said aircraft, each actuator assembly including a hydraulic actuator, a high-pressure pump means for providing hydraulic fluid under pressure to said actuator, and a motor means for driving said pump, each of said actuator assemblies being located generally adjacent an aircraft control effector to be controlled by said actuator assembly;

a fluid-tight housing enclosing at least a portion of said actuator assembly, said fluid-tight having an inlet and an outlet, said housing being filled with low pressure hydraulic fluid which surrounds said portion of said actuator assemble to maintain the temperature of said actuator assembly within a selected range;

a fluid compensator coupled to the outlet of said housing for controlling the fluid flow out of said housing;

an electrical power cable coupled to each of said actuator assemblies;

a low-pressure pumping means for forcibly circulating low-pressure hydraulic fluid from said pressure pumping means to said actuator assembly portions within said under low pressure; and a fluid transmission means coupled from said low pressure pumping means to said inlet of said housing and from said outlet of said housing to a return line for providing said low pressure hydraulic fluid to each of said housings and the portion of said actuator assembly within said housings.

13. The system according to claim 12, wherein said transmission means extends from said pump to said actuator assemblies in parallel to create an individually controllable fluid flow from said pump to each of said actuator assemblies.

14. The system according to claim 12, further including a central reservoir means coupled to said fluid transmission means tubing for providing reservoir fluid to each of said actuator assemblies, and wherein said high-pressure pump includes an inlet coupled to said low-pressure fluid for receiving said low-pressure fluid to replenish the supply of said high-pressure hydraulic fluid.

15. The system of claim 14 wherein said low-pressure hydraulic fluid is mixed with said high-pressure fluid to maintain the temperature of said high-pressure hydraulic fluid within a selected range.

16. A hydraulic control system for an aircraft, comprising:

a plurality of actuator assemblies within said aircraft, each actuator assembly including a hydraulic actuator, a high-pressure pump means for providing hydraulic fluid under pressure to said actuator, and a motor means for driving said pump, each of said actuator assemblies being located generally adjacent an aircraft control effector to be controlled by said actuator assembly;

an electrical power cable coupled to each of said actuator assemblies;

a low-pressure pumping means for forcibly circulating low-pressure hydraulic fluid from said pump to said actuator assemblies under low pressure;

a temperature sensor means within said actuator assembly for sensing the temperature of said high-pressure hydraulic fluid within said actuator assembly;

a fluid transmission means extending between each of said actuator assemblies and said pumping means for providing low-pressure hydraulic fluid to each of said actuator assemblies; and a flow control means coupled between each of said actuator assemblies; and said pumping means for varying the flow volume of said pressure hydraulic fluid to each respective actuator assembly based on said temperature to maintain said temperature within a selected range.

17. The system of claim 16 further including a tremperature-control means for controlling the temperature of said low-pressure hydraulic fluid, said low-pressure hydraulic fluid being in thermal contact with said actuator assembly and said electronic controller to maintain their temperature within a selected range.

18. The system of claim 17 wherein said temperature-control means includes said fluid transmission means extending between said low-pressure pump means and said actuator assembly for cooling the low-pressure hydraulic fluid using ambient air within the aircraft, as said low-pressure hydraulic fluid is circulated from said actuator assemblies to said low-pressure pump means.

19. The system of claim 17 wherein said temperature-control means includes a heat exchanger for cooling said low-pressure fluid to a selected temperature.

20. The system of claim 17 wherein said temperature-control means includes a heater for heating said low-pressure fluid to a selected temperature.

* * * * *

UNITED STATES PATENT AND TRADEMARK OFFICE
CERTIFICATE OF CORRECTION

PATENT NO. : 5,109,672

DATED : May 5, 1992

INVENTOR(S) : Charles C. Chenoweth et al.

It is certified that error appears in the above-identified patent and that said Letters Patent is hereby corrected as shown below:

In column 9, claim 12, line 2, after "under" please insert -- high --.

In column 9, claim 12, line 8, after "fluid-tight" please insert -- housing --.

In column 9, claim 12, line 20, after "said" please insert -- low --.

In column 9, claim 12, line 22, after "said" please insert -- housing --.

In column 9, claim 13, line 30, before "transmission" please insert -- fluid --.

In column 9, claim 14, line 36, please delete therefor "tubing".

In column 9, claim 15, line 43, after "high-pressure" please insert -- hydraulic --.

In column 10, claim 16, line 4, after "under" please insert -- high --.

UNITED STATES PATENT AND TRADEMARK OFFICE
CERTIFICATE OF CORRECTION

PATENT NO. : 5,109,672
DATED : May 5, 1992
INVENTOR(S) : Charles C. Chenoweth, et al.

It is certified that error appears in the above-indentified patent and that said Letters Patent is hereby corrected as shown below:

Column 10, claim 16, line 23, please delete therefor";".

Signed and Sealed this

Seventeenth Day of August, 1993

*Attest:*

BRUCE LEHMAN

*Attesting Officer*     *Commissioner of Patents and Trademarks*